United States Patent [19]

Fine

[11] 3,934,936

[45] Jan. 27, 1976

[54] AUXILIARY WHEEL FOR VEHICLES

[76] Inventor: Maynard W. Fine, 7187 Stonebrook, West Bloomfield, Mich. 48013

[22] Filed: Aug. 13, 1974

[21] Appl. No.: 496,966

Related U.S. Application Data

[63] Continuation-in-part of Ser. No. 351,961, April 17, 1973, Pat. No. 3,866,978.

[52] U.S. Cl. ............................. 301/38 S; 301/39 T
[51] Int. Cl.² ........................................ B60C 17/04
[58] Field of Search ..... 301/38 R, 38 S, 39 R, 39 T, 301/40 R, 40 S, 41, 39 C, 39 CC; 152/152

[56] References Cited
UNITED STATES PATENTS

| | | | |
|---|---|---|---|
| 1,886,977 | 11/1932 | Rodgers | 301/38 S |
| 2,483,574 | 10/1949 | Craig | 301/38 S |

Primary Examiner—M. Henson Wood, Jr.
Assistant Examiner—D. W. Keen
Attorney, Agent, or Firm—Basile and Weintraub

[57] ABSTRACT

An auxiliary wheel for use in conjunction with a conventional pneumatic tired wheel of a vehicle when the pneumatic tire carried by the rim of the conventional wheel becomes inoperative. The auxiliary wheel has a rim member with a hard rubber tire on the outer periphery thereof and is pivotally attached to a coupling member which, in turn, is attachable to the rim of the conventional wheel. The auxiliary wheel is attached to the vehicle wheel in such a manner that upon a limited rotational movement of the wheel the rim member will be moved to a position concentric with and parallel to the wheel and elevate the same to permit the vehicle to be driven without removing the inoperative tire.

7 Claims, 7 Drawing Figures

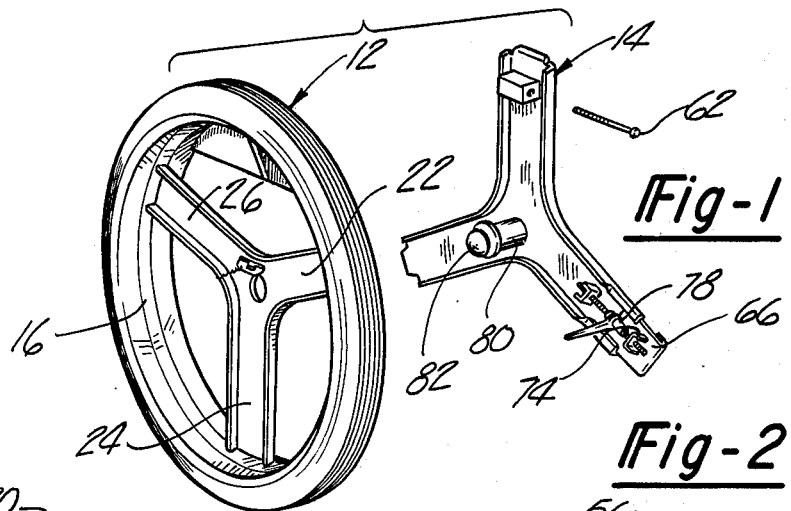
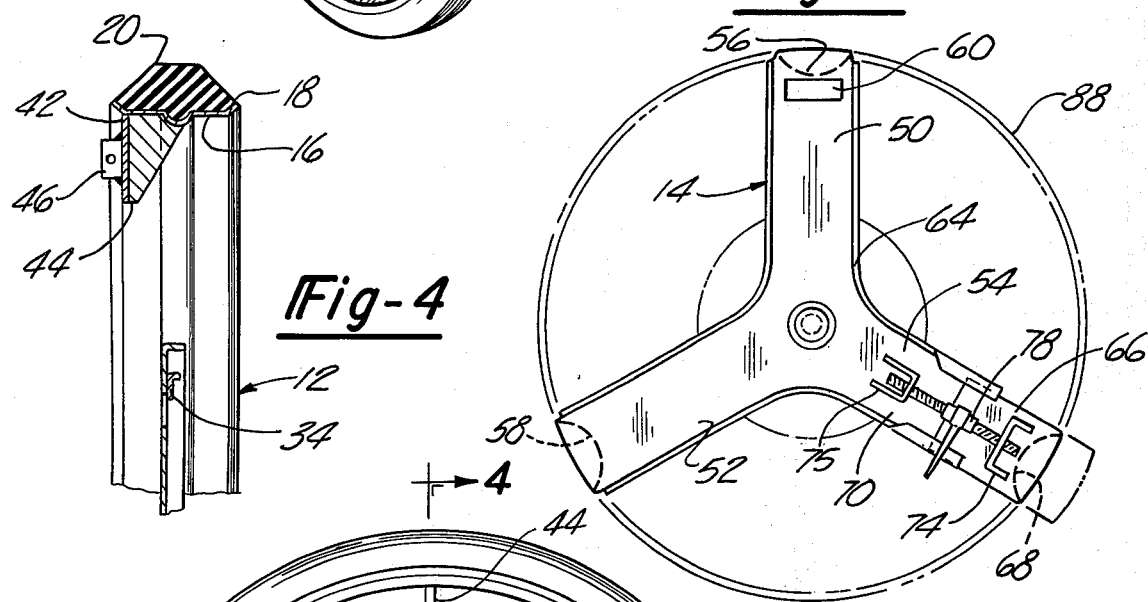

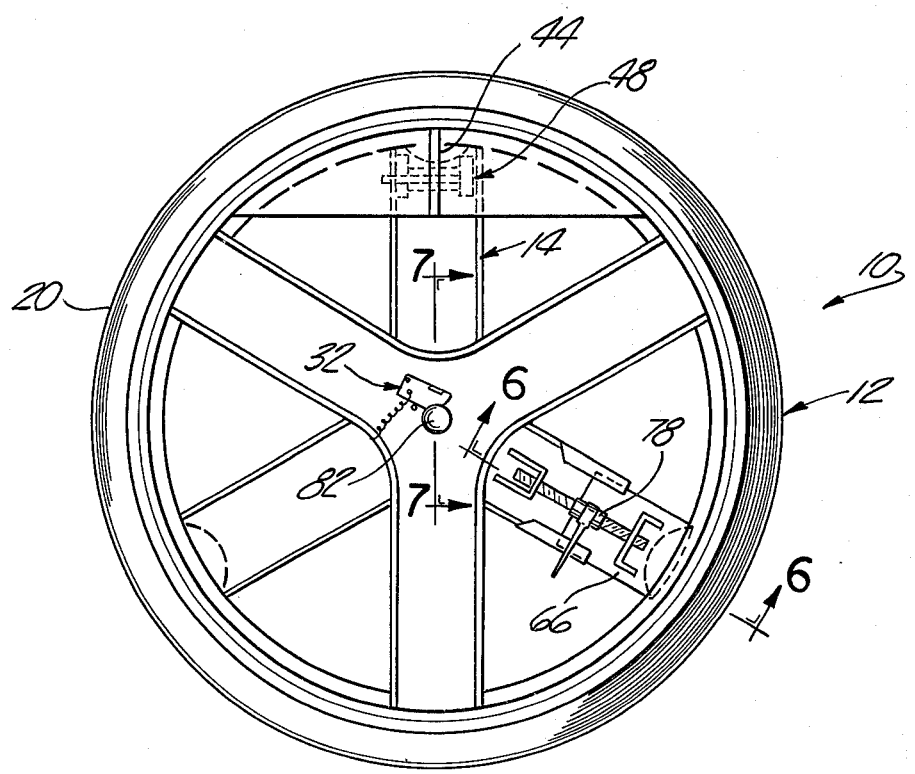
Fig-5
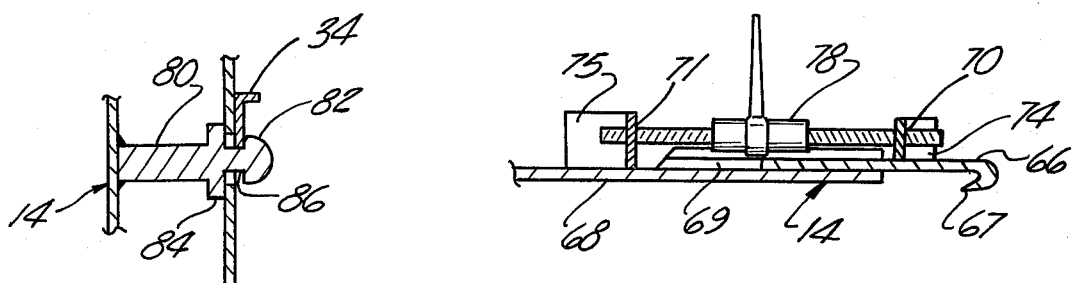
Fig-7
Fig-6

AUXILIARY WHEEL FOR VEHICLES

CROSS REFERENCE TO RELATED PATENT APPLICATIONS

The present patent application is a continuation-in-part of copending U.S. patent application Ser. No. 351,961 filed Apr. 17, 1973, now U.S. Pat. No. 3,866,978.

BACKGROUND OF THE INVENTION

1. Field of the Invention

The present invention relates to an auxiliary wheel for use in conjunction with a conventional wheel of a land traversing vehicle, such as an automobile, and is normally used in emergencies when the pneumatic tire of the regular wheel becomes inoperative.

2. Description of the Prior Art

It is a common practice to provide all motor vehicles with a spare tire and the necessary equipment to facilitate the changing of a tire when one of the automobile tires becomes inoperative, such as when a tire is punctured. Although the spare tire has its drawbacks, the tire has accomplished its function in a fairly acceptable manner in the past. However, the trend today is toward the elimination of the spare tire for the obvious purpose of reducing the cost of the automobile and to eliminate the possible hazard, discomfort and time involved in the changing of a tire when the same becomes inoperative. Other objections to the use of spare tires and the associated equipment necessary for the changing of a tire include the necessity of a substantial amount of storage space. In view of the trend to more and more compact cars, the storage space for the spare tire is becoming critical as this space is needed for the storage of more valuable or useful items, especially if the compact car is to be used on an extended trip. Thus, a prime consideration in the replacement of the spare tire is the requirement for more space and the need to eliminate the cost of the existing spare tire and accompanying equipment. Utmost in the replacement of the spare tire by a suitable substitute is the retention of all the advantages of the spare tire and the elimination of the disadvantages. In providing a substitute for the automobile spare tire, it is necessary to keep in mind that the intended purpose is the provision of a means for reaching a service station or other repair facility in order to have the primary vehicle pneumatic road tire repaired. The substitute should be of minimal weight, convenient in size so that it may be easily handled and requiring a minimum amount of storage space in the vehicle.

Another important consideration of a substitute is the ease of application in using the same, as its installation should eliminate the need for a jack. Further, a substitute should require only a minimum amount of manipulation so that proper use of the same may be obtained by persons of minimum strength and minimum mechanical aptitude.

Obviously, a substitute for the spare tire must be of such a design and construction that the same is dependable in that it may be used continuously and, at reasonable speeds, provide good handling characteristics and vehicle stability.

Heretofore, various attempts have been made at providing a suitable substitute for the automobile spare tire. Such substitutes have been disclosed in U.S. Pat. Nos. 2,535,567, 2,807,507, 2,863,703, 3,024,070, 3,608,970 and 3,644,001. The various designs, constructions and schemes disclosed in the aforementioned provide the desired results, however, they are either complicated in their design, expensive to manufacture, require a separate source of air pressure in order to be usable or are outright impractical.

SUMMARY OF THE INVENTION

The present invention which will be described subsequently in greater detail, comprises an auxiliary wheel for use with a conventional pneumatic tired wheel of an automobile when the pneumatic tire carried by the rim of a conventional wheel becomes inoperative. The auxiliary wheel comprises a tire carrying rim member that is pivotally mounted to a coupling member which, in turn, is releasably attached to the disabled wheel. During initial attachment, the tire carrying rim member is disposed in an eccentric relationship with respect to the conventional wheel; and during a limited rotational movement of the conventional wheel of the vehicle, the tire carrying rim member of the auxiliary wheel is snapped into a locking engagement with a coupling member so that the rim member is disposed concentrically with and parallel to the conventional wheel to elevate the same and facilitate movement of the vehicle without damage to the inoperative tire.

It is therefore a primary object of the present invention to provide an auxiliary wheel which does not require that the vehicle be jacked up or its damaged tire removed.

It is a further object of the present invention to provide an auxiliary wheel whose design utilizes the weight of the automobile to bring the auxiliary wheel into an operative position.

It is still an object of the present invention to provide an auxiliary wheel which may be easily installed without any special equipment, and which is provided with means to insure that the auxiliary wheel remains attached to the automobile during transit.

It is still a further object of the present invention to provide an auxiliary wheel that offers both cost and weight savings over the conventional spare tire, and which makes it possible for the designer of automobiles to increase trunk storage space by the elimination of the conventional spare tire.

It is yet a further object of the present invention to provide all the aforementioned advantages with a new and improved auxiliary wheel that is of a simple and inexpensive design which will readily adapt itself for use on conventional wheels without any modification to the conventional wheel rim.

Other objects, advantages and applications of the present invention will become apparent to those skilled in the art of auxiliary wheels when the accompanying description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a perspective view of an auxiliary wheel constructed in accordance with the principles of the present invention;

FIG. 2 is a plan elevational view of the coupling member of the auxiliary wheel illustrated in FIG. 1 with the coupling member being shown attached to the rim of a conventional wheel;

FIG. 3 is a plan elevational view of the rim and tire portion of the auxiliary wheel illustrated in FIG. 1;

FIG. 4 is a fragmentary cross-sectional view of the rim and tire portion of the auxiliary wheel taken along the line 4—4 of FIG. 3;

FIG. 5 is a front elevational view of the rim and coupling members of the auxiliary wheel with the auxiliary wheel being shown in a position concentric with and parallel to the vehicle wheel;

FIG. 6 is a fragmentary cross-sectional view of the coupling member taken along line 6—6 of FIG. 5; and FIG. 7 is a fragmentary cross-sectional view of the rim and coupling members of the auxiliary wheel taken along the line 7—7 of FIG. 5.

DESCRIPTION OF THE PREFERRED EMBODIMENT

Referring now to the drawings and in particular to FIG. 1, wherein there is illustrated one example of the present invention in the form of an auxiliary wheel 10, comprising a rim member 12 and a coupling member 14 adapted to be attached to the wheel rim 88 (FIG. 2) of a vehicle wheel of the type on which is mounted a conventional pneumatic tire (not shown).

As can best be seen in FIGS. 3 and 4, the auxiliary wheel rim member 12 comprises an outer circular ring 16 on which is formed a peripheral U-shaped recess 18 that mounts a solid rubber tire 20. The rim member 12 further comprises a structural support means which interconnects portions of the inner periphery of the ring; the illustrated embodiment having a plurality of radially extending rim support arms 22, 24 and 26 which extend radially from the axis of rim member 12 and terminate in a fixed attachment with the inner-periphery of the ring 16. The rim support arms 22, 24 and 26 are provided with structural support side walls 28. The central portion of the rim support arms is provided with an aperture 30 and a locking means 32 to insure that the auxiliary wheel 10 remains attached to the vehicle wheel during transit. The locking means 32 is comprised of a pawl member 34 which is pivotally fastened to the central portion of rim member 12 by a pivot arm 36 at the outward most edge of the pawl member 34. A stop pin member 37 is affixed to rim member 12 to limit the rotation of pawl member 34. A spring member 38 is pivotally connected at one end to pawl member 34 and at its other end to the rim support arm 26, such that the force of spring member 38 normally maintains the pawl in abutting contact with stop pin 37. The relative positioning of pivot arm 36 and stop pin 37 with respect to aperture 30 is an important feature of the locking means 32, and in its preferred embodiment, is positioned such that pawl 34 overlaps aperture 30 by a predetermined amount. By lifting upwardly on a tab 40 on pawl member 34, the pawl can be rotated in a counter-clockwise fashion by overcoming the force of spring 38, thereby fully exposing the aperture 30 as illustrated by the phantom lines in FIG. 3.

The rim member 12 is also provided with means for pivotally connecting the rim member 12 to the coupling member 14 which is, in part, comprised of an arcurately shaped coupling hinge support member 42, which is rigidly affixed to the radially inward side of the ring 16 at its rearwardmost peripheral surface, and carries a triangularly shaped structural brace member 44 which is rigidly fastened along one leg to the hinge support member 42 and along another leg to the inner periphery of ring 16. The coupling hinge support member 42 carries a pair of elements 46 of a coupling hinge 48 (FIG. 5), which are rigidly affixed about the center portion thereof. The elements 46 of coupling hinge 48 are provided with transverse apertures for receiving a coupling pin 62 and are positioned such that said apertures are colinearly and horizontally disposed.

Referring now to FIGS. 2 and 6 wherein there is illustrated the coupling member 14 which comprises a pair of fixed, radially extending arm members 50 and 52, and a radially extendable and retractable arm member 54 for releasably attaching the coupling member to a disabled vehicle wheel. The fixed arm member 50 has an inwardly bent and rounded end portion 56. The fixed arm member 52 is arcurately spaced 120 degrees from the fixed arm member 50 and also has an inwardly bent and rounded end portion 58. The fixed arm member 50 carries an element 60 of the coupling hinge 48 rigidly affixed thereto on its interior side near the top edge thereof. The element 60 is provided with a longitudinal aperture which mates with the aforementioned hinge elements 46, which, in conjunction with a suitable coupling pin 62 (FIG. 1) form the hinged coupling 48, thereby providing means for pivotally connecting the coupling member 14 to the rim member 12. The arm members 50, 52 and 54 are provided with structural support side walls 64.

The radially adjustable arm member 54 is comprised of a movable element 66 with an inwardly bent and rounded end portion 67, and a stationary member 68 which is arcurately spaced 120 degrees from arm member 50, and which terminates in a C-shaped channeled portion 69. The movable element 66 is adapted so as to slideably engage the channeled portion 69 of stationary member 68 thereby restricting movement of the movable element 66 to radial translation. A first anchor block 74 is provided with a threaded, radially transverse aperture 70, and is rigidly affixed to the exterior surface of the movable element 66 along its longitudinal centerline. A second anchor block 75 is provided with an oppositely threaded radially transverse aperture 71, and is rigididly affixed to the exterior surface of stationary member 68 in a radially colinear relationship with the first anchor block. An elongated rod 76 having oppositely threaded end portions, which mate with the first and second anchor blocks respectively, is provided with a ratchet device 78 disposed coaxially about the elongated rod 76. Rotation of the ratchet device 78 about the longitudinal axis of elongated rod 76 causes the relative displacement of the stationary and movable adjustable arm members.

Referring now to FIG. 7, the coupling member 14 is provided with a cylindrical shaft element 80 for lockingly engaging the rim member 12 to maintain their concentric relationship while the vehicle is in transport and for positively fixing said members relative axially transverse position. The cylindrical shaft 80 has a rounded end portion 82 which is appropriately shaped to mate with the aperture 30 of rim member 12. The cylindrical shaft 60 is also provided with a cylindrical collar portion 84, of a diameter greater than that of the shaft 80, which is disposed near the end portion 82. Furthermore, a circumferential groove 86 is provided in shaft 80 disposed between the collar portion 84 and the end portion 82 and of an appropriate width so as to mate with rim member 12 and pawl member 34. The interrelationship of the aforementioned elements shall become apparent as subsequently described.

As can best be seen in FIGS. 2 and 5, the coupling member 14 is utilized to attach the auxiliary wheel 10 to a disabled automobile wheel. During initial attachment, the fixed arms 50 and 52 are positioned on the face of the rim 88 of a disabled vehicle wheel, such that the bent edges 56 and 58 engage behind the outer peripheral edge of the wheel rim 88, and the hinged coupling element 60 being vertically spaced above the axis of rotation of the wheel. The radially adjustable arm 54 engages its bent edge 68 with the peripheral edge of the wheel rim 88 by outwardly extending the arm's movable member 66 past the face of wheel rim 88 as shown by the phantom lines in FIG. 2. The ratchet member 78 is then manipulated so as to draw the movable member 66 securely and lockingly against the wheel rim edge. When the radially adjustable arm 54 is in the position illustrated in FIG. 2, the coupling member 14 is fixidly but releasably secured to the vehicle rim 88; and the cylindrical shaft member 80 is concentric with the axis of rotation of the wheel rim 88. The rim member 12 is then pivotally attached to coupling member 14 by mating the respective elements of hinge 38 and inserting coupling pin 62 through the apertures therein. In this position, the rim member 12 and the wheel rim 88 are disposed in a common plane having axis of rotation which are relatively eccentric. With the auxiliary wheel 10 in this position, the driver of the vehicle will drive the vehicle forward to rotate the vehicle wheel approximately 180°, whereupon the hinged coupling 48 of the auxiliary wheel 10 will be displaced to a position which is vertically below the axis of rotation of the vehicle wheel. In this position, the weight of the automobile acting on the auxiliary wheel 10 will force the same to rotate about the hinged coupling 48 upwardly and toward the vehicle wheel and coupling member 14 previously attached thereto. Said rotation will cause the aperture 30 in rim member 12 to pass over the end portion 82 of shaft 80, simultaneously lifting the pawl member 34 upwardly, and will cause the interior surface of the central portion of rim member 12 to abuttingly contact the collar portion 84 of shaft 80. The force of the spring member 38 will cause the pawl member 34 to rotate about pivot arm 36 in a clockwise fashion thereby engaging said pawl with the circumferential groove 86 in shaft 80, and locking the rim member 12 in a position which is concentric with and parallel to the vehicle wheel.

In this position, the vehicle wheel is elevated a sufficient distance to permit movement of the vehicle without damage to the wheel tire. It should be noted that the radial distance between the aperture 30 and the hinge elements 46 must be equal to the radial distance between the shaft 80 and the hinge element 60 in order for the auxiliary wheel 10 to be moved into a concentric position with the vehicle wheel.

After the auxiliary wheel 10 has been attached to the inoperative wheel, the vehicle may be driven for a reasonable distance at reasonable speeds to a service station or the like, whereupon the auxiliary wheel may be removed; and the attendant may repair the inoperative tire. Removal of the auxiliary wheel is simply facilitated by raising the inoperative wheel with a conventional jack, releasing the pawl member 34 and pivoting the wheel rim member 12 away from coupling member 14. The radially adjustable arm 54 of the coupling member 14 is extended by manipulating ratchet member 78, and the entire coupling member 14 may be simply removed from the rim 88 of the vehicle wheel.

It can thus be seen that the present invention provides an extremely simple auxiliary wheel which is easily attachable to the regular wheel of a motor vehicle when the tire carried by the vehicle wheel is inoperative.

It can also be seen that the present invention provides a new and improved auxiliary wheel which has eliminated the shortcomings of the prior art devices and spare tires, as aforementioned.

Although only one example of the present invention has been disclosed, it should be understood that by those skilled in the art of auxiliary wheels, that other forms may be had, all coming within the spirit of the invention ans scope of the appended claims.

What is claimed is as follows:

1. An auxiliary wheel for use with a conventional pneumatic tired vehicle wheel when the pneumatic tire carried by the rim of the conventional wheel is inoperative, said auxiliary wheel comprising;
   a circular rim member having an outer diameter greater than that of the rim of said conventional wheel;
   a tire carried on the outer peripheral surface of said rim member;
   structural support means interconnecting portions of the inner periphery of said rim member;
   a coupling member having means for releasably attaching said coupling member to said wheel rim;
   means pivotally connecting said coupling member to said circular rim member, said rim member being in a non-coaxial position with respect to said wheel rim when said coupling member is attached thereto, said rim member being movable from said non-coaxial position to a coaxial position with respect to said wheel rim when said wheel is rotated a limited distance; and
   a locking means for lockingly engaging said rim member to said coupling member to maintain said rim member in said coaxial position.

2. The auxiliary wheel as defined in claim 1 wherein said coupling member comprises;
   a support member having a plurality of radially extending arms with inwardly bent ends adapted to engage the peripheral surface of said wheel rim;
   one of said arms being radially extendable and retractable for engagement with said wheel rim; and
   means to lockingly adjust the length of said radially adjustable arm to releasably attach said coupling member to said wheel rim.

3. The auxiliary wheel as defined in claim 2 wherein the radially adjustable arm and means for lockingly adjusting the length of said radially adjustable arm for securing said coupling member to said wheel rim comprises;
   a stationary member of said radially adjustable arm having its radially outward end terminating in a channel portion;
   a movable element of said radially adjustable arm adapted to slideably engage said channeled portion of said stationary member;
   a first anchor block with a threaded longitudinal aperture, said first anchor block being rigidly affixed to said movable member;
   a second anchor block with a longitudinal aperture threaded oppositely from said first anchor block, said second anchor block being rigidly affixed to said stationary member;

an elongated rod with oppositely threaded end portions which mate with said first anchor block and said second anchor block; and a ratchet disposed coaxially about said elongated rod, said ratchet having means to lockingly rotate to said elongated rod.

4. The auxiliary wheel defined in claim 2 further comprising rubber inserts carried within the bent end of said other arms of said coupling member to restrain said coupling member from movement with respect to said vehicle rim peripheral surface.

5. The auxiliary wheel as defined in claim 1 wherein said locking means for lockingly engaging said rim member to said coupling member comprises;

an aperture in said rim member at the axis of rotation of said rim member;

a pawl pivotally affixed to the center portion of said coupling member;

a pivot arm for rotably fastening said pawl to said coupling member;

a stop pin for limiting the rotation of said pawl;

a spring attached at one end to said pawl and at the other end to said coupling member; and a shaft rigidly affixed to the center of said coupling member and disposed perpendicularly thereto; said shaft having a collar portion for relationally positioning said rim member and said coupling member; said shaft having a circumferentially grooved portion for abuttingly engaging said pawl; said shaft having a rounded end portion for piloting said aperture over said shaft.

6. The auxiliary wheel defined in claim 1, wherein said structural support means of said rim member comprises a plurality of radially disposed arm members terminating at said rim and originating from the axis of rotation of said rim member.

7. The auxiliary wheel defined in claim 1, wherein said rim member and coupling member are of sufficient strength to support the weight of the vehicle on which said wheel is attached.

* * * * *